United States Patent [19]
Leempoel

[11] Patent Number: 6,034,171
[45] Date of Patent: Mar. 7, 2000

[54] ORGANOSILOXANE COMPOSITIONS

[75] Inventor: Patrick Leempoel, Brussels, Belgium

[73] Assignee: Dow Corning S.A., Seneffe, Belgium

[21] Appl. No.: 09/122,969

[22] Filed: Jul. 27, 1998

Related U.S. Application Data

[62] Division of application No. 08/832,018, Apr. 2, 1997, Pat. No. 5,833,798.

[51] Int. Cl.[7] ..................................................... C08K 5/54
[52] U.S. Cl. ......................... 524/730; 524/265; 524/267; 524/731
[58] Field of Search ................................... 524/730, 731, 524/265, 267

[56] References Cited

U.S. PATENT DOCUMENTS

| | | | |
|---|---|---|---|
| 3,294,729 | 12/1966 | Hort et al. | 260/29.6 |
| 3,334,067 | 8/1967 | Weyenberg | 528/901 |
| 3,677,996 | 7/1972 | Kaiser et al. | 260/46.5 |
| 3,689,454 | 9/1972 | Smith et al. | 260/46.5 |
| 4,100,129 | 7/1978 | Beers | 260/37 |
| 4,113,691 | 9/1978 | Ward | 260/37 |
| 4,247,445 | 1/1981 | Smith, Jr. et al. | 260/37 |
| 4,261,758 | 4/1981 | Wright et al. | 106/287.12 |
| 4,293,616 | 10/1981 | Smith, Jr. et al. | 428/447 |
| 4,304,897 | 12/1981 | Bluestein | 528/20 |
| 4,444,974 | 4/1984 | Takase et al. | 528/901 |
| 4,460,740 | 7/1984 | Arai | 524/724 |
| 4,513,115 | 4/1985 | Beers | 524/731 |
| 4,525,400 | 6/1985 | Suprenant | 156/309 |
| 4,537,944 | 8/1985 | Imai | 528/18 |
| 4,618,646 | 10/1986 | Takago et al. | 524/783 |
| 4,797,439 | 1/1989 | Peccoux | 524/188 |
| 4,888,404 | 12/1989 | Klosowski et al. | 528/15 |
| 5,013,800 | 5/1991 | Inoue | 525/477 |
| 5,162,407 | 11/1992 | Turner | 524/108 |
| 5,260,348 | 11/1993 | Shepherd et al. | 528/901 |
| 5,286,537 | 2/1994 | Oita et al. | 428/34 |
| 5,403,881 | 4/1995 | Okawa et al. | 524/261 |
| 5,489,479 | 2/1996 | Lucas et al. | 428/412 |

FOREIGN PATENT DOCUMENTS

| | | | |
|---|---|---|---|
| 52-073998 | 6/1977 | Japan . | |
| 56-076452 | 6/1981 | Japan . | |
| 56-076453 | 6/1981 | Japan . | |
| 115456 | 7/1982 | Japan | 528/901 |
| 57-115456 | 7/1982 | Japan . | |
| 3294355 | 12/1991 | Japan . | |
| 05186763 | 7/1993 | Japan . | |
| 05345888 | 7/1993 | Japan . | |
| WO9310186 | 5/1993 | WIPO . | |

*Primary Examiner*—Melvyn I. Marquis
*Attorney, Agent, or Firm*—Patricia M. Scaduto

[57] ABSTRACT

A moisture curable composition comprises a mixture and/or a reaction product of a polymeric material having not less than two groups bonded to silicon which are hydroxyl or hydrolyzable groups, an alkoxysilane curative, an adhesion promoter and catalyst material for catalyzing the condensation reaction between the polymeric material and the alkoxysilane curative. The adhesion promoter comprises a silicone-organic copolymer consisting of units (I) according to the general formula $R_aR'SiO_{(4-a)/2}$ and units (II) according to the general formula $R_bR'SiO_{(3-b)/2}$ where R represents a monovalent hydrocarbon group and R' represents an oxyalkylene chain $R^6(C_2H_4O)_x(C_3H_6O)_yZ$ in which $R^6$ represents a hydrocarbon linkage to a silicon atom, Z represents H or a carboxylic acid residue. Also disclosed is a method of forming an elastomeric mass between surfaces which is adherent to at least two such surfaces which method comprises introducing between the surfaces said moisture curable composition.

7 Claims, No Drawings

ORGANOSILOXANE COMPOSITIONS

This application is a divisional of application, Ser. No. 08/832,018, filed Apr. 2, 1997, U.S. Pat. No. 5,833,798.

This invention is concerned with moisture curable organosiloxane compositions which are curable to elastomers and also relates to the use of such compositions as sealing materials.

Organosiloxane compositions which cure to elastomeric solids are well known. Typically, such compositions are obtained by mixing a polydiorganosiloxane having reactive terminal groups, generally silanol groups, with a silane cross-linking agent for the polydiorganosiloxane, for example an alkoxy silane, an acetoxy silane, an oxime silane or an amino silane. These materials are frequently curable upon exposure to atmospheric moisture at room temperature. One important application of the above-described curable compositions is their use as sealants in which there is formed an elastomeric mass between surfaces which is adherent to at least two such surfaces. It is frequently desirable that the composition cures quickly enough to provide a sound seal within several hours but not so quickly that the surface cannot be tooled to desired configuration shortly after application. One important requirement of such materials is the ability to adhere well to a variety of substrates and it is a normal practice to include so called adhesion promoters in such compositions. The use of plastics in various industries, particularly the construction industry, is increasing. This is especially true for plastics such as polyvinylchloride (PVC), used for window frames, polymethylmethacrylate (PMMA), used for bathtub and bathroom accessories, and polycarbonate (PC) such as Lexan, used as transparent sheeting material or for the manufacture of safety glass laminates and insulating glass units.

Although many calcium carbonate filled neutral sealants are available that develop sufficient adhesion to such plastics, silica filled materials typically show poorer plastic adhesion than their calcium carbonate filled counterparts. It is known to include in alkoxy and oxime sealants an amino-alkoxy-silane, or one of its derivatives, or a silane with Si-N bonds, to ensure adhesion to plastics, particularly to PVC, PMMA and PC. However, we have found that with silica filled alkoxy compositions, the presence of such amino-silane is not sufficient to provide reliable adhesion on plastics other than PVC and that another solution has to be found to achieve good adhesion to PMMA and PC.

Surprisingly we have now found that such compositions which include certain silicon organic polymers as an adhesion promoter have exceedingly good adhesion to commonly used building materials.

According to the present invention there is provided a method of forming an elastomeric mass between surfaces which is adherent to at least two such surfaces which method comprises introducing between the surfaces a mass of a moisture curable composition which comprises a mixture and/or a reaction product of a polymeric material having not less than two groups bonded to silicon which are independently selected from hydroxyl and other hydrolysable groups, an alkoxysilane curative, a finely divided filler and catalyst material for catalysing a condensation reaction between the polymeric material and the alkoxysilane curative, characterised in that the composition further includes an adhesion promoter which comprises a silicone-organic copolymer consisting of units (i) according to the general formula $R_aSiO_{(4-a)/2}$ and units (ii) according to the general formula $R_bR'SiO_{(3-b)/2}$ where each R is the same or different and represents a monovalent hydrocarbon group having up to 20 carbon atoms, each a is the same or different and has a value from 0 to 3, each b is the same or different and has a value from 0 to 2 and R' is the same or different and represents an oxyalkylene chain $R^6(C_2H_4O)_x(C_3H_6O)_yZ$ where $R^6$ represents a hydrocarbon linkage to a silicon atom, each Z is the same or different and represents H or a carboxylic acid residue, each x is the same or different and has a value from 0 to 20 and each y is the same or different and has a value from 0 to 20 and x+y has a value from 3 to 40.

The polymeric material used in the method of the present invention may be represented by the general formula X-A-X where A may be any desired organic or siloxane molecular chain, for example a polyoxyalkylene chain or more preferably a polydiorgano-siloxane chain and thus preferably includes siloxane units $R''_sSiO_{(4-s)/2}$ in which R'' represents an alkyl group having from 1 to 6 carbon atoms, for example a methyl group, a vinyl group or a phenyl group, or fluorinated alkyl group and s has a value of 0, 1 or 2. Preferred materials are linear materials, i.e. preferably s=2 for all units. Preferred materials have polydiorgano-siloxane chains according to the general formula —(R''$_2$SiO)hd t— in which each R'' represents a methyl group and t has a value from about 200 to about 1500. Suitable materials have viscosities of the order of about 500 mPa.s to about 200,000 mPa.s. The groups X of the polymeric material are hydroxyl or other hydrolysable groups and may be selected, for example, from —R''$_2$SiOH, —R''Si(OR$^5$)$_2$, —Si(OR$^5$)$_3$, —R''$_2$SiOR$^5$ or —R''$_2$SiR'''SiR''$_p$(OR$^5$)$_{3-p}$ where R'' is as aforesaid, and is preferably methyl, R''' is a divalent hydrocarbon group which may be interrupted by one or more siloxane spacers having up to 6 silicon atoms, R$^5$ represents an alkyl or oxyalkyl group in which the alkyl groups have up to 6 carbon atoms and p has the value 0, 1 or 2.

In the composition used in the method of the present invention the alkoxysilane curative is preferably of the general formula $R''_{4-n}Si(OR^5)_n$ wherein R'' and R$^5$ are as aforesaid and n has a value of 2, 3 or 4. Preferred silanes are those wherein R'' represents methyl, ethyl or vinyl, R$^5$ represents methyl or ethyl and n is 3. Examples of operative silanes are methyl tri(methoxy) silane, vinyl trimethoxy silane, methyl triethoxy silane, and vinyl triethoxy silane. A sufficient amount of this silane is employed to ensure adequate stability of the composition during storage and adequate crosslinking of the composition when exposed to atmospheric moisture.

The moisture curable composition used in the method of the present invention comprises a silicone-organic copolymer as an adhesion promotor (hereinafter also referred to as silicone glycol) consisting of units (i) according to the general formula $R_aSiO_{(4-a)/2}$ and units (ii) according to the general formula $R_bR'SiO_{(3-b)/2}$ where each R is the same or different and represents a monovalent hydrocarbon group having up to 20 carbon atoms, each a is the same or different and has a value from 0 to 3, each b is the same or different and has a value from 0 to 2 and each R' is the same or different and represents an oxyalkylene chain $R^6(C_2H_4O)_x(C_3H_6O)_yZ$ where $R^6$ represents a hydrocarbon linkage to a silicon atom, each Z is the same or different and represents H or a carboxylic acid residue, each x is the same or different and has a value from 0 to 20 and each y is the same or different and has a value from 0 to 20 and x+y has a value from 3 to 40. In preferred materials, the units (ii) are chain units and b has the value 1. Preferred materials are according to the general formula $R_3SiO(R_2SiO)_s(RR'SiO)_tSiR_3$ in which s has a value of 10 to 125 and t has a value of 2 to 15 and most preferably the groups R are either methyl groups or groups $C_{12}H_{25}$. The groups R' may include either oxyethylene groups or oxypropylene groups or both and these groups preferably provide no more than 40% by weight of the silicone organic polymer.

The compositions used in the method of this invention preferably contain a silica as the finely divided filler, such as high surface area fume and precipitated silicas, and may also contain as optional constituents other ingredients which are conventional to the formulation of silicone rubber sealants and the like. For example, the compositions will normally contain one or more other finely divided, reinforcing or extending fillers such as crushed quartz, diatomaceous earths, calcium carbonate, barium sulphate, iron oxide, titanium dioxide and carbon black. The proportion of such fillers employed will depend on the properties desired in the elastomer-forming composition and the cured elastomer. Usually the filler content of the composition will reside within the range from about 5 to about 150 parts by weight per 100 parts by weight of the polymeric material.

Other ingredients which may be included in the composition are catalysts and co-catalysts for increasing the rate of cure of the composition, pigments, plasticisers, agents (usually organosilicon compounds) for treating fillers, rheological additives for improving toolability of the composition and adhesion improving substances for example γ-aminopropyl triethoxysilane. Preferred catalysts are titanium compounds, for example tetra isopropyl titanate and tetra n butyl titanate, which can provide improved surface cure time and skin elasticity of the cured elastomeric mass compared to elastomeric masses formed by condensation reactions catalysed by other catalysts.

Co-catalysts are well known in the art and include the metal salts of carboxylic acids, for example lead octoate and dibutyltin dilaurate, dibutyltin diacetate and stannous octoate. If a more rapid cure is desired, a chelate, for example an acetyl acetonate, may be added to the mixture. Acetyl acetonate materials conventionally used as accelerators for titanium catalysts may be employed, for example ethyl aceto acetate and methyl aceto acetate. Another ingredient which can be employed as a plasticiser and to reduce the modulus of the cured elastomer is a polydimethylsiloxane having terminal triorganosiloxy groups wherein the organic substituents are e.g. methyl, vinyl or phenyl or combinations of these groups. These polydimethylsiloxanes normally have a viscosity of from about 100 to about 100,000 mPa.s at 25° C. and can be employed in amounts up to about 80 parts per 100 parts by weight of the polymeric material.

The composition can be prepared by mixing the ingredients in any order and employing any suitable mixing equipment. It is generally preferred to add the curing catalyst after mixing together the polymeric material and the curative silane. Optional additional ingredients may be incorporated at any stage of the mixing operation but are preferably added after the catalyst. After mixing, the compositions should be stored under substantially anhydrous conditions, for example in sealed containers, until required for use.

The composition may be formulated as single part formulations which are stable in storage but cure on exposure to atmospheric moisture and may be employed in a variety of applications, for example as coating, caulking and encapsulating materials. It is, however, particularly suitable for sealing joints, cavities and other spaces in articles and structures which are subject to relative movement. It is thus particularly suitable as glazing sealants and for sealing building structures. It has desired cure properties to provide cured seals of modulus sufficiently low for most industry standards and elongation to break which is sufficiently high for most industry standards.

According to the present invention there is also provided a method for promoting adherence of an elastomeric mass to two or more surfaces, which elastomeric mass is formed from a moisture curable composition comprising a mixture and/or a reaction product of a polymeric material having not less than two groups bonded to silicon which are independently selected from hydroxyl and other hydrolysable groups, an alkoxysilane curative, a finely divided filler and catalyst material for catalysing a condensation reaction between the polymeric material and the alkoxysilane curative, characterised in that the method comprises including an adhesion promoter in the composition, which adhesion promoter comprises a silicone organic copolymer consisting of units (i) according to the general formula $R_aSiO_{(4-a)/2}$ and units (ii) according to the general formula $R_bR'SiO_{(3-b)/2}$ where R, a, b and R' are as defined herein above.

According to the present invention there is further provided a moisture curable composition which comprises a mixture and/or a reaction product of a polymeric material having not less than two groups bonded to silicon which are independently selected from hydroxyl and other hydrolysable groups, an alkoxysilane curative, a finely divided filler and catalyst material for catalysing a condensation reaction between the polymeric material and the alkoxysilane curative, characterised in that the composition further includes an adhesion promoter which comprises a siliconeorganic copolymer consisting of units (i) according to the general formula $R_aSiO_{(4-a)/2}$ and units (ii) according to the general formula $R_bR'SiO_{(3-b)/2}$ where R, a, b and R' are as defined herein above.

The present invention will now be illustrated by way of example embodiments thereof. In the description all parts are expressed by weight, all viscosities are at 25° C., Me represents methyl, PMMA represents polymethylmethacrylate and SNJF represents the Syndicat National des Joints et Facades of France.

EXAMPLE 1

A first Masterbatch sealant composition was prepared by mixing at room temperature in absence of moisture 70 parts of a first polymeric material (I) 4.5 parts of methyl trimethoxysilane (MTM), 10 parts of silica pre-treated with polydimethylsiloxane, 13.5 parts of trimethylsilyl end-blocked polydimethylsiloxane fluid of viscosity 100 mPa.s., 1.5 parts of tetra n-butyl titanate, 0.3 parts of ethyl aceto acetate and 0.25 parts of an adhesion promoter formed from aminoethyl aminopropyl trimethoxysilane and γ-glycidoxypropyl trimethoxysilane. The polymeric material I was of the formula $(RO)_3Si—R^1—(Me_2SiO)_tR^1—Si(OR)_3$ in which R represents ethyl, $R^1$ represents $C_2H_4$, and t has a value such that the polymer has a viscosity of about 60,000 mPa.s.

A first illustrative composition was prepared by mixing 1 part of a silicone glycol A with 99 parts of the first Masterbatch. The silicone glycol A was of the general formula $Me_3SiO—(Me_2SiO)_{64}(MeR'SiO)_3—SiMe_3$ where R' represents $—(C_3H_6O)—(C_3H_6O)_4—OH$. Various physical properties of the Masterbatch and the first illustrative composition were evaluated using standard test methods as follows.

Skin-Over-Time,(min) was measured by spreading the material to form a layer 0.32+/−0.08 cm thick on a clean smooth non porous surface. The sample was exposed to relative humidity of 50% RH at 25° C. At one minute intervals the surface was lightly touched with a finger tip and the finger slowly drawn away. This was repeated every minute until the sample did not adhere to the finger tip. The time in minutes elapsed from spreading the material until the surface did not adhere to the finger tip was recorded as Skin-Over-Time.

Tack-Free-Time (min) was measured by spreading the material 2 mm thick on a clean smooth non porous surface. The sample was exposed to 50% RH at 22° C.. At intervals of 5 minutes or less a clean polyethylene strip was laid on a fresh surface of the sample and gently pulled off. The time elapsed between spreading the sample and when the strip pulled away cleanly from the surface was recorded as the Tack-Free-Time (MIL-S-8802F).

Slump (mm) was determined using a flow jig. The cavity of the flow jig was filled with the sample and levelled with two passes of a blade starting at the centre and moving to one side of the jig. The jig was set in a vertical position and the sample allowed to flow down the face of the jig. The point of furthest advance of the sample was recorded as the Slump (ASTM D2202).

Penetration (mm/10) was measured by pouring a sample of the uncured composition in a cup. The pointer of a penetrometer was lowered onto the surface and its depth of penetration through the surface during 3 seconds was recorded as the Penetration.

String (mm) was measured using a container filled with the sample and mounted on a lower clamp of a tensometer and a nozzle mounted on an upper clamp. To measure stringing, the lower clamp was raised to cause the nozzle to dip into the sample to a depth of 20 mm. The lower clamp was then driven downward at 1000 mm per minute until breakage of the string formed between the nozzle and the sealant.

Viscosity (mPa.s) was measured using a cone and plate method with a Carri-Med CSL500 and 4 cm cone.

Modulus 100% (MPa), Elongation at Break (%) and Tensile Strength (MPa) were measured using a moulded and cured standard test slab 2 mm thick of each composition which had been cured by exposure to atmosphere at room temperature on a flat surface for at least 7 days. Tear strips were cut from the cured sample and stretched to breakpoint in a tensometer and the various measurements recorded (ASTM D412).

Hardness (Shore A) was measured using a cured sample of the material and a durometer and the scale was read within 2 seconds after the foot was in firm contact with the sample (ASTM D2240).

Aspect (appearance) was determined by visual observation.

Adhesion was measured on substrate samples treated with the composition and cured for 1 week at room temperature or for 1 week at room temperature and one week of water immersion. Substrates were cleaned with isopropanol/acetone mixture except for concrete which was wire brushed and blown with air (DIN 52455).

TABLE I

|  | Comparative | Illustrative |
|---|---|---|
| Composition | 1 | 1 |
| Masterbatch | 1 | 1 |
| Silicone Glycol | None | A |
| Amount (%) | 0 | 1 |

TABLE I-continued

|  | Comparative | Illustrative |
|---|---|---|
| STANDARD TESTS | | |
| SOT (min) | 25 | 28 |
| TFT (min) | 35 | 35 |
| SLUMP (mm) | 7 | 2 |
| PENETRATION (mm/10) | 215 | 150 |
| STRING (mm) | 90 | 55 |
| VISCOSITY (mPa.s) | 61000 | 39000 |
| MODULUS 100% (MPa) | 0.76 | 0.75 |
| ELONGATION AT BREAK (%) | 245 | 225 |
| TENSILE STRENGTH (MPa) | 1.5 | 1.4 |
| HARDNESS (SHORE A) | 25 | 28 |
| ASPECT | GOOD | GOOD |
| ADHESION (1WRT, 1WRT + 1WH2ORT) to GLASS | 2, 2 | 2, 2 |
| MILL FINISHED ALUMINIUM | 2, 2 | 2, 2 |
| ANODIZED ALUMINIUM | 2, 2 | 2, 2 |
| PMMA ROHM & HAAS | 1, 0 | 2, 1 |
| POLYCARBONATE | 1, 1 | 2, 0 |
| SNJF CONCRETE | 0, 0 | 0, 0 |
| Adhesion rating: | 2 cohesive failure | excellent adhesion |
|  | 1 interfacial failure | acceptable adhesion |
|  | 0 adhesive failure | poor adhesion |

This example shows the adhesion of the first illustrative composition is as good as the comparative composition to glass and aluminium and better on polymethylmethacrylate and polycarbonate.

EXAMPLE 2

A second Masterbatch sealant composition was prepared by mixing at room temperature in absence of moisture 70 parts of a polymeric material (II) 4.5 parts of vinyl trimethoxysilane (VTM), 8 parts of the silica, 13.5 parts of trimethylsilyl end-blocked polydimethylsiloxane fluid of viscosity 100 mPa.s., 1.5 parts of tetra n-butyl titanate, 0.3 parts of methyl trimethoxy silane, 0.5 parts of ethyl aceto acetate and 0.25 parts of the adhesion used in Example 1.

The polymeric material II was of the formula $(RO)_3Si—R^1—(Me_2SiO)_t—R^1—Si(OR)_3$ where each R represents an ethyl group, $R^1$ represents $—C_2H_4—$ and t has a value such that the polymer has a viscosity of 130 000 cSt. A third Masterbatch was prepared of the same formulation as the second Masterbatch but in which 6 parts of silica were present instead of the 8 used in the second Masterbatch.

Second and third illustrative compositions (I2 and I3 respectively) were prepared by mixing 1 part of the silicone glycol A with 99 parts of the second Masterbatch, or 99 parts of the third Masterbatch respectively. The physical properties of the Masterbatches and the second and third illustrative compositions were evaluated using the standard test methods refer to in Example 1.

The results are shown in Table II. Here again, improved adhesion to polymethylmethacrylate and polycarbonate is observed.

TABLE II

| Composition |  | I2 |  | I3 |
|---|---|---|---|---|
| Masterbatch | 2 | 2 | 3 | 3 |
| COPOLYMER | NONE | A | NONE | A |
| Amount (%) | 0 | 1 | 0 | 1 |
| SOT (min) | 15 | 20 | 35 | 55 |

TABLE II-continued

| | | | | |
|---|---|---|---|---|
| TFT (min) | 25 | 28 | 60 | 60 |
| SLUMP (mm) | 65 | 12 | >100 | 47 |
| PENETRATION (mm/10) | 300 | 195 | 350 | 250 |
| STRING (mm) | >100 | 90 | >100 | 100 |
| VISCOSITY mPa.s) | 77000 | 66000 | 67000 | 59000 |
| ASPECT | GOOD | GOOD | GOOD | GOOD |
| ADHESION (1WRT, 1WRT + 1WH2O RT | | | | |
| GLASS | 2, 2 | 2, 2 | 2, 2 | 2, 2 |
| MILL FINISHED ALUMINIUM | 2, 2 | 2, 2 | 2, 2 | 2, 2 |
| ANODIZED ALUMINIUM | 2, 2 | 2, 2 | 2, 2 | 2, 2 |
| PVC | 2, 2 | 2, 2 | 2, 2 | 2, 2 |
| PMMA | 0, 0 | 2, 2 | 0, 0 | 2, 2 |
| PMMA White | 2, 0 | 2, 2 | 2, 0 | 2, 2 |
| POLYCARBONATE | 0, 0 | 2, 0 | 0, 0 | 2, 1 |
| SNJF CONCRETE | 2, 1 | 1, 2 | 2, 1 | 2, 2 |

EXAMPLE 3

A fourth Masterbatch sealant composition was prepared by mixing at room temperature in absence of moisture 70 parts of a polymeric material (III) of the formula $(RO)_3Si—R^1—(Me_2SiO)_t—R^1—Si(OR)_3$ in which R represents ethyl, $R^1$ represents $C_2H_4$, and t has a value such that the polymer has a viscosity of 120,000 cSt, with 4.5 parts of vinyl trimethoxysilane, 6 parts of the silica, 13.5 parts of trimethylsilyl end-blocked polydimethylsiloxane fluid of viscosity 100 mPa.s., 1.5 parts of tetra n-butyl titanate, 0.3 parts of methyl trimethoxy silane, 0.5 parts of ethyl aceto acetate and 0.25 parts of the adhesion promoter.

Fourth, fifth, sixth and seventh illustrative compositions were prepared by mixing 1 part of various silicone glycols with 99 parts of the fourth Masterbatch. The silicone glycols used were the silicone glycol A and silicone glycols B, C, and D. The silicone glycol B was of the general formula $Me_3SiO—(Me_2SiO)_{14}(MeR^2SiO)_2—SiMe_3$ where $R^2$ represents $—C_3H_6—(C_2H_4O)_{12}—OH$. The silicone glycol C was of the general formula $Me_3SiO—(Me_2SiO)_{103}(MeR^3SiO)_{10}—SiMe_3$ where $R^3$ represents $—(C_3H_6)—(C_2H_4O)_{18}—(C_3H_6O)_{18}—OAc$. The silicone glycol D was of the general formula $Me_3SiO—(MeASiO)_{58}—MeBSi—(MeR^4SiO)_2—SiMe_3$ where $R^4$ represents $—(C_3H_6)—(C_2H_4O)_{18}—(C_3H_6O)_{18}—OH$, A represents $C_{12}H_{25}$ and B represents $C_2H_4SiMe_2O$. Comparative compositions C4 and C5 were made using as additive either Genapal (an ethylene oxide-propylene oxide polymer with 40% ethylene oxide and MW 2800) or Arcol 1025 (an ethylene oxide-propylene oxide polymer with 75% ethylene oxide and MW 4000).

The physical properties of these compositions, were evaluated using the standard test methods refer to in Example 1.

The results are shown Table III.

TABLE III

| | Illustrative | | | | C4 | C5 |
|---|---|---|---|---|---|---|
| Composition | 4 | 5 | 6 | 7 | | |
| ADDITIVE | Silicone Glycol | | | | Gena | Arcol |
| | A | B | C | D | -pol | 1025 |
| Glycol mole % | 4 | 13 | 9 | 3 | 100 | 100 |
| Glycol weight % | 11 | 43 | 66 | 21 | 100 | 100 |

TABLE III-continued

| | | | | | | |
|---|---|---|---|---|---|---|
| End-group | OH | OH | OAc | OH | OH | OH |
| SOT (min) | 18 | 24 | 24 | 22 | 23 | 22 |
| Yield Point (Pa) | 87 | 20 | 19 | 16 | 18 | 18 |
| Penetration (.1 mm/3s) | 296 | >350 | >350 | >350 | >350 | >350 |
| Extrusion (g/min) | 180 | 177 | 194 | 184 | 162 | 178 |
| Opacity (%) | 63 | 82 | 81 | 78 | 87 | 88 |
| Glass | 2 | 2 | 2 | 2 | 1* | 1* |
| Anodized Aluminium | 2 | 2 | 2 | 2 | 2 | 2 |
| Mill Aluminium | 2 | 2 | 2 | 2 | 0 | 0 |
| PVC | 2 | 2 | 2 | 2 | 2 | 2 |
| Polycarbonate | 2 | 2 | 2 | 2 | 2 | 2 |
| PMMA R&H | 2 | 2 | 2 | 2 | 2 | 2 |
| PMMA | 2 | 0 | 0 | 2 | 0 | 0 |
| SNJF concrete | 0.5 | 0 | 2 | 2 | 2 | 2 |

Adhesion testing: 1 week room temperature cure.

In this Example it can be seen that compositions including the silicone glycols showed adhesion to a range of materials.

What is claimed is:

1. A moisture curable composition which comprises a product obtained by mixing a polymeric material having not less than two groups which are independently selected from the group consisting of $—R''_2SiOH$ and $—R''_2SiR'''SiR''_2(OR^5)_{3-p}$, where each R'' represents an alkyl group having from 1 to 6 carbon atoms; R''' is a divalent hydrocarbon group which may be interrupted by one or more siloxane spacers having up to six silicon atoms, $R^5$ represents an alkyl or oxyalkl group in which the alkyl groups have up to 6 carbon atoms; and p has the value 0, 1, or 2, an alkoxysilane curative, (a finely divided filler) and catalyst material for catalysing a condensation reaction between the polymeric material and the alkoxysilane curative, the composition further including an adhesion promoter which comprises a silicone-organic copolymer consisting of units (i) according to the general formula $R_aSiO_{(4-a)/2}$ and units (ii) according to the general formula $R_bR'SiO_{(3-b)/2}$ where each R is independently selected from the group consisting of monovalent hydrocarbon groups having up to 20 carbon atoms, each a is independently selected and has a value from 0 to 3, each b is independently selected and has a value from 0 to 2 and each R' is independently selected and represents an oxyalkylene chain $R^6(C_2H_4O)_x(C_3H_6O)_yZ$ where $R^6$ represents a hydrocarbon linkage to a silicon atom, each Z is independently selected and is selected from the group consisting of H and carboxylic acid residues, each x is the independently selected and has a value from 0 to 20 and each y is independently selected and has a value from 0 to 20 and x+y has a value from 3 to 40.

2. The moisture curable composition of claim 1, wherein the polymeric material has not less than two groups which are $—R''_2SiR'''SiR''_p(OR^5)_{3-p}$ groups.

3. The moisture curable composition of claim 1, wherein the catalyst material is a titanium compound.

4. A moisture curable composition comprising a polymeric material having not less than two groups which are independently selected from the group consisting of $—R''_2SiOH$ and $—R''_2SiR'''SiR''_p(OR^5)_{3-p}$, where each R'' represents an alkyl group having from 1 to 6 carbon atoms; R''' is a divalent hydrocarbon group which may be interrupted by one or more siloxane spacers having up to six silicon atoms, $R^5$ represents an alkyl or oxyalkyl group in which the alkyl groups have up to 6 carbon atoms; and p has the value 0, 1, or 2, an alkoxysilane curative, a finely divided filler, and catalyst material for catalysing a condensation reaction between the polymeric material and the alkoxysilane curative, the composition further including an adhesion promoter which comprises a silicone-organic copolymer consisting of units (i) according to the general formula $R_aSiO_{(4-a)/2}$ and units (ii) according to the general formula $R_bR'SiO_{(3-b)/2}$ where each R is independently selected from the group consisting of monovalent hydrocarbon groups having up to 20 carbon atoms, each a is independently selected and has a value from 0 to 3, each b is independently selected and has a value from 0 to 2 and each R' is independently selected and represents an oxyalkylene chain $R^6(C_2H_4O)_x(C_3H_6O)_yZ$ where $R^6$ represents a hydrocarbon linkage to a silicon atom, each Z is independently selected and is selected from the group consisting of H and carboxylic acid residues, each x is the independently selected and has a value from 0 to 20 and each y is independently selected and has a value from 0 to 20 and x+y has a value from 3 to 40.

5. The moisture curable composition of claim 4, wherein the polymeric material has not less than two groups which are $-R''_2SiR'''SiR''_p(OR^5)_{3-p}$ groups.

6. The moisture curable composition of claim 4, wherein the catalyst material is a titanium compound.

7. A moisture curable composition comprising a polymeric material having not less than two groups bonded to silicon which are independently selected from the group consisting of hydroxyl and other hydrolysable groups, an alkoxysilane curative, a finely divided filler and a catalyst material comprising a titanium compound for catalysing a condensation reaction between the polymeric material and the alkoxysilane curative, the composition further including an adhesion promoter which comprises a silicone-organic copolymer consisting of units (i) according to the general formula $R_aSiO_{(4-a)/2}$ and units (ii) according to the general formula $R_bR'SiO_{(3-b)/2}$ where each R is independently selected from the group consisting of monovalent hydrocarbon groups having up to 20 carbon atoms, each a is independently selected and has a value from 0 to 3, each b is independently selected and has a value from 0 to 2 and each R' is independently selected and represents an oxyalkylene chain $R^6(C_2H_4O)_x(C_3H_6O)_yZ$ where $R^6$ represents a hydrocarbon linkage to a silicon atom, each Z is independently selected and is selected from the group consisting of H and carboxylic acid residues, each x is the independently selected and has a value from 0 to 20 and each y is independently selected and has a value from 0 to 20 and x+y has a value from 3 to 40.

* * * * *